United States Patent [19]
Hara et al.

[11] Patent Number: 5,499,511
[45] Date of Patent: Mar. 19, 1996

[54] HEAT PUMP TYPE AIR CONDITIONER FOR VEHICLE

[75] Inventors: Junichiro Hara, Yokohama; Takayoshi Matsuoka, Tokyo, Japan

[73] Assignee: Nissan Motor Co., Ltd., Yokohama, Japan

[21] Appl. No.: 423,847

[22] Filed: Apr. 18, 1995

[30] Foreign Application Priority Data

Apr. 19, 1994 [JP] Japan .................................. 6-080626

[51] Int. Cl.$^6$ .................................................. F25D 17/00
[52] U.S. Cl. .......................................... 62/180; 62/228.4
[58] Field of Search ................... 62/228.4, 180; 165/43; 236/49.3

[56] References Cited

U.S. PATENT DOCUMENTS 4,667,480  5/1987  Bessler ...................................... 62/180
4,907,416  3/1990  Fujii ......................................... 62/180
5,316,074  5/1994  Isaji et al. ................................ 165/43

FOREIGN PATENT DOCUMENTS

1-296056  11/1989  Japan .
2-290475  11/1990  Japan .

*Primary Examiner*—William E. Wayner
*Attorney, Agent, or Firm*—Foley & Lardner

[57] ABSTRACT

A vehicular air conditioner is of a heat pump type including a vapor compression refrigeration cycle. The refrigeration cycle comprises a compressor of a type which changes a changing speed of a correlation amount of a refrigerant discharge amount according to whether an operating condition of the air conditioner is manually changed by a vehicle passenger or not. Therefore, the vehicle passenger can recognize that an discharging capacity of the compressor is changed according to the passenger's operation.

22 Claims, 10 Drawing Sheets

HEAT PUMP TYPE AIR CONDITIONER FOR VEHICLE

BACKGROUND OF THE INVENTION

1. Field of the Invention

The present invention relates to improvements in a vehicular heat-pump type air conditioner provided with a vapor compression refrigeration cycle, and more particularly to a heat pump type air conditioner having a compressor of a variable discharge capacity type.

2. Description of the Related Art

A variety of vehicular heat-pump type air conditioners have been proposed, for example, in Japanese Patent Provisional Publications Nos. 1-296056 and 2-290475. Each of conventional air conditioners is provided with a vapor compression refrigeration cycle and is arranged to execute a heating operation by utilizing engine waste heat. Furthermore, in order to improve the heating characteristic without utilizing such engine waste heat, inventors of the present invention have proposed a new type air conditioner of a heat-pump type. The new type air conditioner is provided with a heat-radiating inner heat exchanger in addition to a heat-absorbing inner heat exchanger and is arranged to change an operation mode by controlling a three-way valve.

These air conditioners are arranged to change the refrigerant discharge amount of a compressor by changing a rotation speed or discharging capacity of the compressor according to the condition of the refrigeration cycle. The change of the refrigerant discharge amount is executed by a passenger's operations such as starting and stopping of the compressor and switching of cooling operation and heating operation, and by an automatic changing operation of the system according to the condition of the refrigerant cycle.

However, in such air conditioners, the refrigerant discharge amount is changed by single changing rate (or changing speed). Accordingly, if the compressor is of a type which slowly changes the refrigerant discharge amount for protecting the compressor or keeping the stable operation of the refrigeration cycle, it is not easy for the passenger to recognize as to whether the refrigerant discharge amount is actually changed according to a command to the compressor such as start and stop commands and the switching of operation mode, or not.

SUMMARY OF THE INVENTION

It is an object of the present invention to provide a vehicular heat-pump type air conditioner which is arranged so that a vehicle passenger can recognize the change of the refrigerant discharge amount when such change is commanded by the passenger.

A heat pump type air conditioner according to the present invention is for a vehicle and comprises refrigerant and a compressor applies a workload to the refrigerant. A compressor commanding device commands the compressor to set a correlation amount of a refrigerant discharge amount according to a vehicle passenger's operation. An air-flow making device males a flow of conditioned air to be supplied to a passenger compartment. A flow-rate commanding device commands the air-flow making device to set a flow rate of the flow of the conditioned air according to the vehicle passenger's operation. A thermal control device thermally controls the conditioned-air, and includes a refrigeration cycle where the refrigerant is circulated by the operation of the compressor. A thermal-control commanding device commands the thermal control device to be set at a thermal operating condition according to the vehicle passenger's operation. A changing-speed setting device sets a changing-speed of a correlation amount of a refrigerant discharge amount from the compressor according to a presence of a o command from at least one of the compressor commanding device, the flow-rate commanding device and the thermal-control commanding device. A control device controls the compressor, the air-flow making device and the thermal control device according to the command from the compressor commanding device, the flow-rate commanding device and the thermal-control commanding device, so that the correlation amount of the refrigerant discharge amount is changed at the changing-speed set by the changing-speed setting means.

BRIEF DESCRIPTION OF THE DRAWINGS

In the drawings, like reference numerals designate like parts and elements throughout all figures, in which.

DETAILED DESCRIPTION OF THE INVENTION

Referring to FIGS. 1 to 5, there is shown a first embodiment of a heat-pump type air conditioner according to the present invention.

Figure 1:
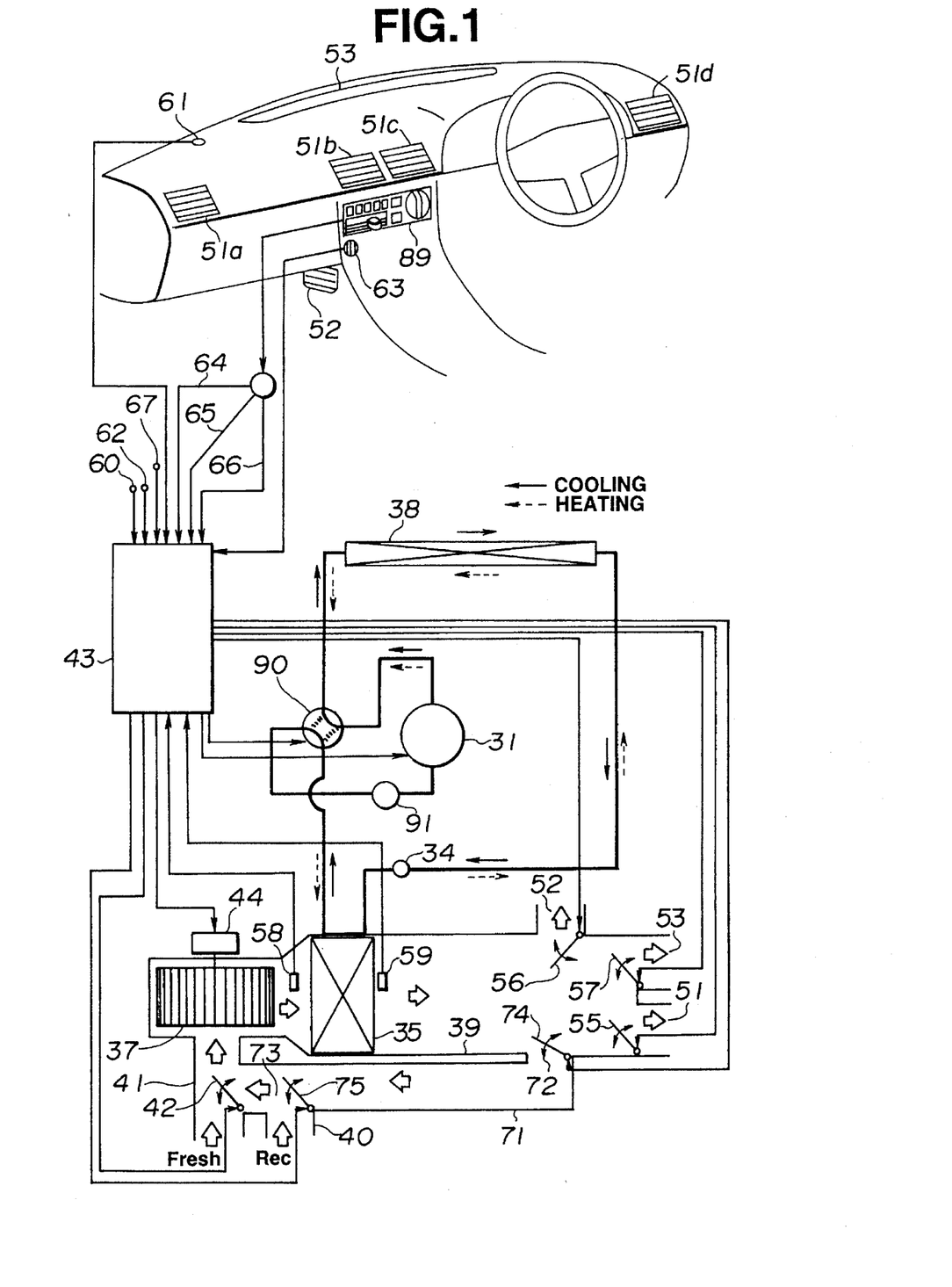
FIG. 1 is a schematic view of a first embodiment of an air conditioner for a vehicle according to the present invention.
Figure 2:
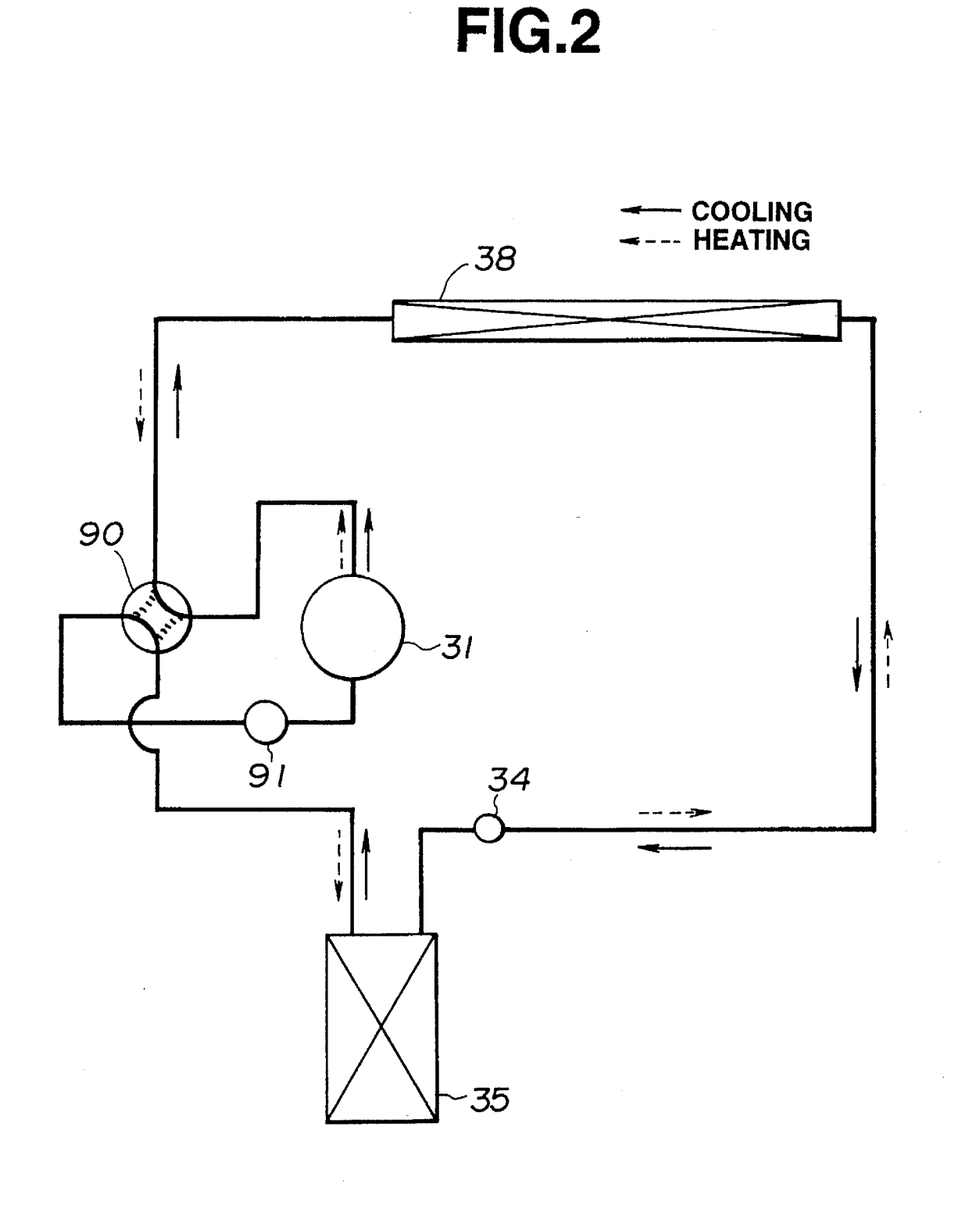
FIG. 2 is a schematic view of a refrigeration cycle of the first embodiment where a refrigerant flow during each operation mode is indicated by arrows.

The heat-pump type air conditioner is for an automotive vehicle and comprises a refrigeration cycle system as shown in FIGS. 1 and 2. The refrigeration cycle of the first embodiment comprises a compressor 21, an outer heat exchanger 38, an inner heat exchanger 35, an accumulator 91, an expansion valve 34, and a four-way valve 90.

As shown in FIG. 1, the compressor 31 is disposed outside of a passenger compartment of the automotive vehicle, such as in an engine room. The compressor 31 is of a type which variably changes a refrigerant discharge amount by changing its rotation speed, such as of an electric drive type or hydraulic drive type. The outer heat exchanger 38 functions to transmit the heat between the refrigerant and the ambient air. That is, the outer heat exchanger 38 functions as an outer condenser which radiates the heat of the refrigerant discharged from the compressor 31 into the ambient air, or functions as a radiator or heat-absorber. The inner heat exchanger 35 is disposed in a duct 39 which disposed at a front portion in the passenger compartment such as at an inside of the instrument panel. The inner heat exchanger 35 functions as a radiator or heat-absorber. The expansion valve 34 atomizes liquid-refrigerant by the adiabatic expansion and feed it to the outer heat exchanger 38 or inner heat exchanger 35. The accumulator 91 separates gas-refrigerant from gas-liquid mixture and supplies it to the compressor 31.

During a cooling operation, the four-way valve 90 is switched as indicated by a solid line, as shown in FIG. 1. Accordingly, the refrigerant is circulated in the refrigeration cycle system as follows: the compressor 31→the four-way valve 90→the outer heat exchanger 38→the expansion valve 34→the outer heat exchanger 35→the four-way valve 90→the accumulator 91→the compressor 31. Therefore, the heat of the refrigerant in the air conditioner is radiated through the outer heat exchanger 38, and the heat of the air flowing through the duct 39 is absorbed into the refrigerant through the inner heat exchanger 35. On the other hand, during a heating operation, the four-way valve 90 is switched at a position shown by a broken line. Accordingly, the refrigerant is circulated in the system as follows: the compressor 31→the four-way valve 90 →the inner heat exchanger 35→the expansion valve 34→the outer heat exchanger 38→the four-way valve 90→the accumulator 91→the compressor 31. Therefore, the outer heat exchanger 38 functions to absorb the heat of the ambient air to the refrigerant, and the inner heat exchanger 35 functions to radiate the heat of the refrigerant into the conditioned air fed by the blower fan 37 for generating warm air for the heating operation.

The blower fan 37 is driven by a blower fan motor 44 and is disposed in the duct 39. An inner air inlet 40 for leading inlet air and an outer air inlet 41 for leading outer air caused by rum pressure of the vehicle are connected to an inlet portion of the duct 39. An intake door 42 is disposed at a boundary portion between the outer air inlet 41 and the duct 39. Both of inner air and outer air are supplied to the inner heat exchanger 35 by means of the blower fan 37. The intake door 42 is arranged to open and close the outer air inlet 41 by using an intake door actuator (not shown) controlled by a control unit 43. The blower fan 37 is disposed downstream of the inner and outer air inlets 40 and 41 and upstream of the heat-absorbing inner heat exchanger 35 in the duct 39. The blower fan 37 is arranged to be rotated by a blower fan motor 44 which is controlled by the control unit 43.

In the duct 39, there are further provided a ventilator outlet 51 (51a, 51b, 51c, 51d) for feeding the conditioned air toward an upper side of a vehicle passenger (not shown), a foot outlet 52 for feeding the conditioned air toward a foot portion of the vehicle passenger, and a defroster outlet 53 for feeding the conditioned air toward a front glass (not shown) of the automotive vehicle. Further, there are provided a ventilator door 55, a foot door 56, and a defroster door 57 in the duct 39. The ventilator door 55 is arranged to open and close the ventilator outlet 51 according to the operation of a ventilator door actuator (not shown) which is controlled by the control unit 43. The foot door 56 is arranged to open and close the foot outlet 52 according to the operation of a foot door actuator (not shown) which is controlled by the control unit 43. The defroster door 57 is arranged to open and close the defroster outlet 53 according to the operation of a defroster door actuator (not shown) which is controlled by the control unit 43.

A circulation passage 71 is connected to the duct 39 so as to be communicated with the inner air inlet 40. An inlet door 74 is disposed at an opening 72 of the circulation passage 71. An outlet door 75 is disposed at a branch portion 73 between the circulation passage 71 and the inner air inlet 40. The inlet door 74 is arranged to open and close the opening 72 by means of an inlet door actuator (not shown) which is driven according to a signal from the control unit 43. The outlet door 75 is arranged to change a communicating condition of the branch portion 73 by means of an outlet door actuator (not shown) which is driven according to a signal from the control unit 43. That is, the conditioned air is circulated from the downstream portion of the duct 39 to an upstream side of the blower fan 37 when the inlet door 74 and the outlet door 75 are opened wherein the outlet door 75 is positioned to close the inner air port 40.

The control unit 43 is connected to an inlet air temperature sensor 58 for the inner heat exchanger 35, an outlet air temperature sensor 59 for the inner heat exchanger 35, an outlet air temperature sensor 60 for the ventilator outlet 51, a solar radiation sensor 61, an outer air (ambient air) temperature sensor 62, a room air temperature sensor 63, a room temperature setting device 64 which is disposed in an air-conditioner panel 89, an outlet-port mode switch 65, a blower fan switch 66, and an outer heat exchanger outlet-air temperature sensor 67. The room temperature setting device 64, the outlet-port mode switch 65 and the blower fan switch 66 are installed in an air-conditioner control panel 89 shown in FIG. 1. The room temperature setting device 64 includes a manual temperature setting lever (no numeral) through which a vehicle passenger manually sets a preset room temperature $T_{ptc}$.

The inlet air temperature sensor 58 detects an inlet air temperature $T_{suc}$ and sends it to the control unit 43. The outlet air temperature sensor 59 detects an outlet air temperature $T_{out1}$ and sends it to the control unit 43. The outlet air temperature sensor 60 detects a ventilator outlet air temperature $T_{vent}$ and sends it to the control unit 43. The solar radiation sensor 61 detects a solar radiation amount $Q_{sun}$ to the vehicle and sends it to the control unit 43. The ambient air temperature sensor 62 detects an ambient air temperature $T_{amb}$ and sends it to the control unit 43. The room temperature sensor 63 detects a room air temperature $T_{ic}$ and sends it to the control unit 43. The outer heat exchanger outlet-air temperature sensor 67 detects an outlet-air temperature $T_{out2}$ of the outer heat exchanger 38. The preset room temperature $T_{ptc}$ is set by the room temperature setting device 64 and is sent to the control unit 43. Such detected data function as the thermal information. The outlet-port mode selecting switch 65 is arranged to set an outlet port mode for blowing out the conditioned air into the passenger compartment. The outlet port mode includes a ventilating mode for mainly blowing out the air to an upper portion of front passengers, a foot mode for mainly blowing out the air to a foot portion of the passenger, a bi-level mode for blowing out the air to both of the upper portion and foot portion of the passenger. The blower fan switch 66 is disposed for selecting an air quantity of the blower fan 37.

The control unit 43 calculates a target air-conditioned state, such as, a rotation speed of the compressor 31, an air flow rate $V_{eva}$ fed by the blower fan 37, the outlet port mode of the conditioned-air according to thermal information from the thermal information detecting means. Furthermore, on the basis of the calculated values, the control unit 43 controls the compressor 31, the blower fan motor 44, the return door actuator, the ventilator door actuator, the foot door actuator, and the defroster door actuator so as to correspond the air-conditioned state with the calculated target air-conditioned state.

In particular, the rotation speed of the compressor 31 is controlled according to the set position of the temperature setting lever of the temperature setting device 64. That is, when the temperature setting lever is set at a position commanding the heating operation, the rotation speed of the compressor 31 becomes larger as the lever is set nearer to the maximum heating position, and becomes smaller as the lever is set nearer to the minimum heating position. Similarly, when the temperature setting lever set at a cooling position commanding the cooling operation, the rotation speed of the compressor 31 becomes larger as the lever is set nearer to the maximum cooling position, and becomes smaller as the lever is set nearer to the minimum cooling position.

In this embodiment according to the present invention, the temperature setting device 64 serves as a compressor commanding means for commanding the compressor 31 to set a correlation amount of a refrigerant discharge amount and as a thermal-control commanding means for commanding a refrigeration cycle to be set at a thermal operating condition. The blower fan 37 serves as an air-flow making means for making a flow of conditioned air to the passenger compartment. The blower fan switch 66 serves as a flow-rate commanding means for commanding the air-flow making means to set a flow rate of the flow of the conditioned air. The heat exchangers 35 and 38 and the expansion valve 34, which constitute the refrigeration cycle, serve as a thermal control means for thermally controlling the conditioned-air. The control unit 43 serves as a control means for controlling the compressor 31, the air-flow making means and the thermal control mean, as a changing-speed setting means for setting a changing-speed of a correlation amount of a refrigerant discharge amount from the compressor 31 and as an operating condition switching means which selects a control mode from a ventilating operation and a thermal-control operation.

The manner of air-conditioning control by the control unit 43 will be discussed hereinafter with reference to flowcharts of FIGS. 3 to 5.

Figure 3:
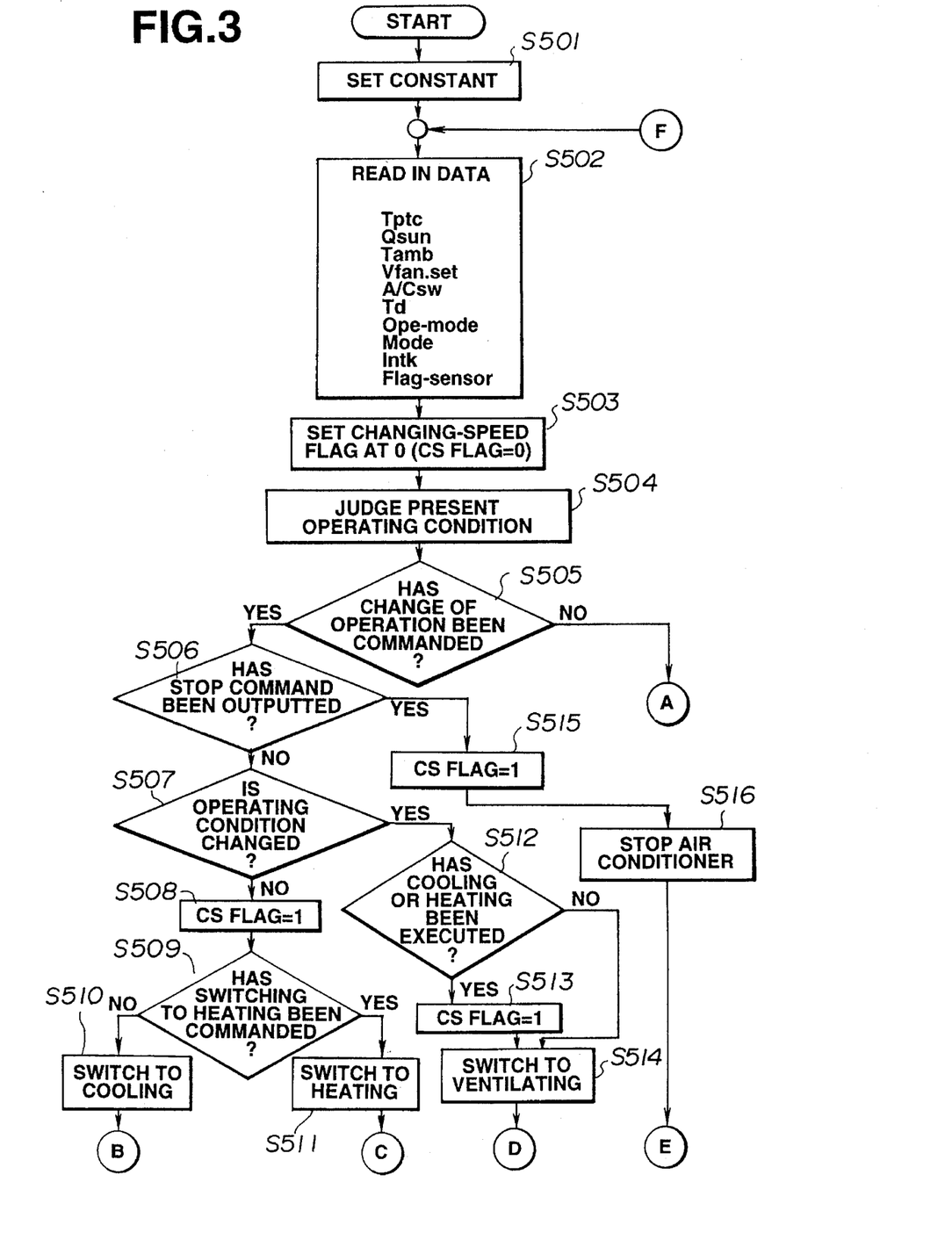
FIG. 3 is a part of a flowchart which is applied to the control of the first embodiment of FIG. 1.

In a step S501 of FIG. 3, constants used in various calculations are set. In a step S502, the control unit 43 reads in various data such as the set temperature $T_{PTC}$ corresponding the lever position of the temperature setting lever constituting the temperature setting device 64, the solar radiation amount $Q_{sun}$, an ambient temperature $T_{amb}$, a control information $V_{fan-set}$ of the fan switch setting value, a signal $A/C_{sw}$ indicative of the switching condition of the air conditioner switch, a refrigerant discharge temperature $T_d$, a signal $O_{pe-mode}$ indicative of a present operation mode, a signal Mode indicative of the outlet-port mode position, a signal $I_{ntk}$ indicative of an inlet port lever position, and a flag $F_{lag-sensor}$ indicative of occurrence of abnormality of sensors.

In a step S503, a changing-speed flag (CS Flag), by which a changing speed (change rate) of the rotation speed of the compressor 31 is determined, is set at 0 (CS Flag=0). When CS Flag=0, the rotation speed of the compressor 31 is slowly changed. When CS Flag=1, the rotation speed is rapidly changed.

In a step S504, the control unit 43 judges the present operating condition of the air conditioner from the set positions of the air conditioner switch and the temperature setting lever. When the temperature setting lever is positioned at a lower temperature side, it is judged that the operating condition is set in the cooling operation. When positioned at a high temperature side, it is judged that the operating condition is set in the heating operation. When positioned at middle, it is judged that the ventilating operation is selected. Herein, the ventilating operation is an operating condition where the blower fan 37 is operated without the operation of the compressor 31. Accordingly, in this ventilating operation, the conditioned air from the blower fan 37 is blown out to the passenger compartment without heating or cooling the conditioned air.

In a step S505, the control unit 43 judges as to whether the change of the operation has been commanded or not, wherein the command for changing the operation is corresponding to the shifting of the temperature setting lever or to the stoppage of the operation of the system. When the change of the operation is commanded, the routine proceeds to a step S506 wherein it is judged whether the stop command has been outputted or not. When the answer of the step S506 is "NO", the routine proceeds to a step S507 wherein it is judged whether the operating condition is changed to the ventilating operation from the other operation. When the answer of the step S507 is "NO", the routine proceeds to a step S508 wherein CS Flag is set at 1 (CS Flag=1). Following this the routine proceeds to a step S509. That is, when the command to switch to an operation except for the ventilating operation has been outputted, the changing-speed flag is set at 1 (CS Flag=1). In the step S509 it is judged whether the switching to the heating operation has been commanded or not. When the answer of the step S509 is "NO", it is judged that the switching to the cooling operation has been commanded and the routine proceeds to a step S510 wherein the four-way valve 90 is switched to the cooling operation position. Following this, the routine proceeds to a step S526 wherein the rotation speed of the compressor 31 at a time after the change of the rotation speed according to the temperature setting lever is calculated.

In a step S527 it is judged whether the difference (deviation) between the previous rotation speed and the present rotation speed of the compressor 31 is larger than a predetermined value or not. When the answer of the step S527 is "NO", the routine proceeds to a step S529 wherein the changing-speed flag is set at 0 (CS Flag=0). When the answer of the step S527 is "YES", the routine proceeds to a step S528 wherein the changing-speed flag is set at 1 (CS Flag=1).

Figure 5:
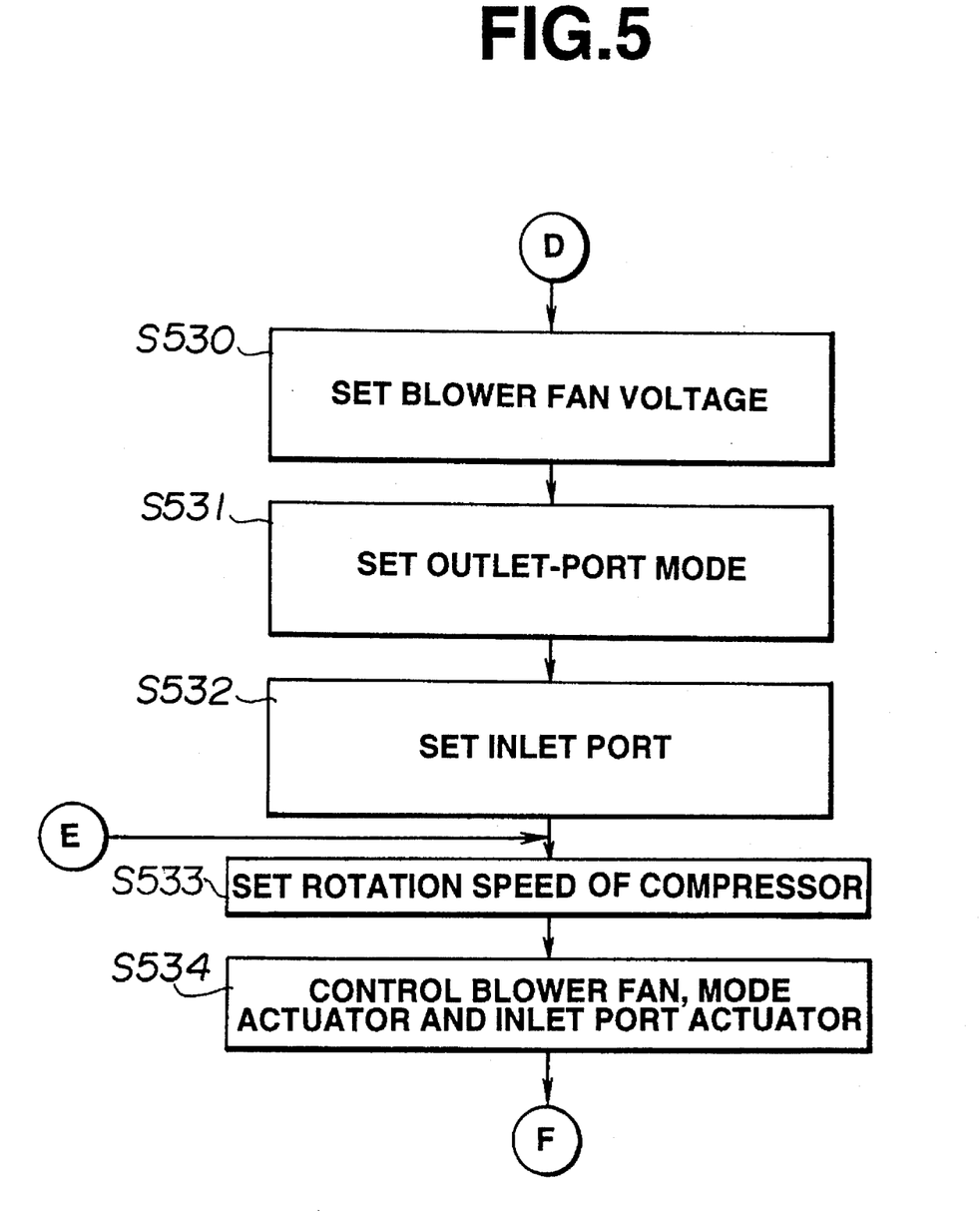
FIG. 5 is another part of the flowchart which is applied to the control of the first embodiment of FIG. 1.

Following this, in a step S530 of FIG. 5, the blower fan voltage is set according to the operating condition of the blower fan switch 66. In a step S531 the outlet-port mode is set according to the operating condition of the outlet-port mode switch 65. In a step S532 the inlet port is set according to the inlet port lever position.

In a step S533, the rotation speed of the compressor 31 is set. That is, the rotation speed is kept on when a change command for changing the rotation speed has not been outputted, and is changed according to the change command when it has been outputted. In addition, when a stop command has been outputted the compressor 31 is stopped. By setting the changing-speed flag at 1, the rotation speed of the compressor 31 is quickly changed. On the other hand, by setting the changing-speed flag at 0, the rotation speed is slowly changed. For example, in case that the compressor 31 is of a type driven by an electric motor and its maximum rotation speed is 100%, the rotation speed is changed by a rate of 1–3% per second (first speed) when the changing-speed flag is set at 1, and the rotation speed is changed by a rate of 0.08–0.4% per second (second speed) when the changing-speed flag is set at 0. It will be understood that these quick and slow changes of the rotation speed may not be limited by the above content.

Since the pressure in the refrigeration cycle function to radically stop the compressor 31, if the stoppage of the compressor 31 is executed, the rate of the changing-speed is further accelerated.

When the operation mode is changed to the cooling operation and the changing-speed of the rotation speed of the compressor 31 is larger than a predetermined value, the rotation speed of the compressor 31 is quickly changed and therefore the refrigerant discharge amount is quickly changed. If the rotation speed of the compressor 31 is quickly changed, the vehicle passenger can sense the change of the rotation speed from the change of sounds and vibrations (can recognize the change of the rotation speed). Further, it becomes possible to quickly obtain a desired air-conditioned state by quickly changing the rotation speed of the compressor 31. On the other hand, in case that the change rate (changing-speed) of the rotation speed of the compressor 31 is smaller than the predetermined value, since it is possible to quickly obtain the desired air-conditioned state even if the rotation speed of the compressor 31 is not quickly changed. Accordingly, in this case, the rotation speed of the compressor 31 is slowly changed upon taking account of the stability of the refrigeration cycle.

In a step S534 the blower fan 37, the mode actuator and the inlet port actuator are controlled so as to be accurately set at the condition corresponding to the set condition in the steps S530 to S532. Following this, the routine returns to the step S502.

On the other hand, when the answer of the step S509 in FIG. 3 is "YES", that is, when the switching to the heating operation has been commanded, the routine proceeds to a step S511 wherein the four-way valve 90 is switched at a heating operation position. Following this, the routine proceeds to a step S518 in FIG. 4 wherein the rotation speed of the compressor 31 is calculated from the operating position of the temperature setting lever. Following this, in a step S519, the upper limit of the rotation speed of the compressor 31 is set according to the outlet-air temperature $T_{out2}$ from the outer heat exchanger 38 functioning as a heat-absorbing heat exchanger. In order to prevent the excessive raising of the temperature and pressure in the high pressure side in the refrigeration system, the upper limit is set.

In a step S520, it is judged whether the upper limit set in the step S519 is smaller than the rotation speed commanded by the temperature setting lever or not. When the answer of the step S519 is "NO", the changing-speed flag is maintained and the routine proceeds to the step S530.

Accordingly, in case that the switching to the heating operation has been commanded (a temperature setting flag is set at 1), if the rotation speed of the compressor 31 commanded by the temperature setting lever is smaller than the upper limit, the compressor 31 is quickly changed in the step S533. Accordingly, it is possible to recognize that the rotation speed of the compressor 31 is changed according to the switching to the heating operation.

On the other hand, when the answer of the step 520 is "YES", that is, when the rotation speed of the compressor 31 commanded by the temperature setting lever is higher than the upper limit, the routine proceeds to a step S521 wherein it is judged whether the changing-speed flag is now set at 1 or not. When the answer of the step S521 is "YES", it is judged that the switching to the heating operation is executed, and in the step S524 the changing-speed flag is set at 1. Following this, the routine proceeds to the step S530. Since it is afraid that the temperature and the pressure in the high pressure side of the refrigeration cycle is excessively raised in case that the rotation speed of the compressor 31 is larger than the upper limit, the rotation speed of the compressor 31 is decreased so as to be lower than the upper limit in the step S533 in order to prevent such over raising. When the switching to the heating operation has been commanded, the rotation speed of the compressor 31 is quickly changed according to the setting of the changing-speed flag=1. Accordingly, it is possible to recognize that the rotation speed of the compressor 31 is changed according to the switching to the heating operation.

When the answer of the step S521 is "NO", it is judged that the heating operation is maintained and therefore the routine proceeds to the step S522 wherein it is judged whether the difference (deviation) between the previous and present rotation speed is larger than the predetermined value or not. That is, it is judged whether the changing-speed (change rate) of the rotation speed is larger than the predetermined value or not. When the answer of the step S522 is "NO", the routine proceeds to the step S525 wherein the changing-speed flag is set at 0. Following this, the routine proceeds to the step S530. By slowly changing the rotation speed of the compressor 31, it becomes possible to control the refrigeration cycle of the air conditioner so as to suppress the unstableness thereof (minimum).

When the answer of the step S522 is "YES", that is, when the deviation of the rotation speed is larger than the predetermined value, the routine proceeds to the step S523 wherein it is judged whether the operation mode is changed from a quick heating operation (first control mode) to a stable heating operation (second control mode) or not. The quick heating operation is for quickly heating the passenger compartment by increasing the heating ability. The stable heating operation is executed when the temperature in the passenger compartment generally reaches the set temperature. In case that the quick heating operation is executed, the rotation speed of the compressor 31 is set maximum while the freezing of the outer heat exchanger 38 is prevented. Accordingly, when the operation mode is transferred from the quick heating operation to the stable heating operation, the rotation speed of the compressor 31 is decreased.

When the answer of the step S523 is "YES", it is judged that it is not necessary to inform the change of the rotation speed to the passenger since the change of the rotation speed of the compressor 31 is not executed by the passenger. Accordingly, the routine proceeds to the step S525 wherein the changing-speed of the rotation speed is set at 0. By slowly changing the rotation speed of the compressor 31, it becomes possible to suppress an unstable operation of the refrigeration cycle.

When the answer of the step S523 is "NO", it is judged that the change of the rotation speed has been commanded by the passenger, and the routine proceeds to a step S524 wherein the changing-speed of the rotation speed is set at 1.

When the answer of the step S507 is "YES", the routine proceeds to a step S512 wherein it is judged whether the previous operation has been the cooling operation or the heating operation. In this judgement, the cooling operation and the heating operation correspond to a thermal mode operation. When the answer of the step S512 is "NO", that is, when the air conditioner under a stopping condition has been commanded to execute the ventilating operation, the routine proceeds to S514 wherein the operation mode is set at the ventilating operation. Then, the routine proceeds to the step S530 shown in FIG. 5 to execute the steps S530 to S534 wherein the compressor 31 is set at a stopping state in the step S533.

When the answer of the step S512 is "YES", that is, when the air conditioner has been commanded to change the operation mode from one of the cooling operation and the heating operation to the ventilating operation, the routine proceeds to the step S513 wherein the changing-speed flag is set at 1 (CS Flag=1). Then, the routine proceeds to a step S514. In this case, the compressor 31 under the operating condition is stopped in the step S533. Since the changing-speed flag is set at 1, the rotation speed of the compressor 31 is quickly decreased. Accordingly, the passenger can recognize that the compressor 31 is stopped according to the mode change to the ventilating.

When it is judged in the step 506 that the stoppage of the air conditioner has been commanded, the routine proceeds to a step S515 wherein the changing-speed flag is set at 1. Following this, in a step S516 the air conditioner is stopped and the routine proceeds to the step S530. In this case, the compressor under the operating condition is stopped in the step S533 by quickly decreasing the rotation speed of the compressor 31. In the step S534, the blower fan and the respective actuators are stopped.

When it is judged in the step S505 that the operating condition is maintained (NO), the routine proceeds to a step S517 wherein it is judged which operation mode of the air conditioner is executed. When it is judged that the air conditioner executes the cooling operation, the routine proceeds to a step S526. That is, in case that the cooling operation is maintained, the rotation speed of the compressor 31 is changed such as to be quickly decreased when the changing-speed thereof is high and to be slowly decreased when the changing-speed is small. In case that the set temperature is changed by means of the temperature set lever so that a changed amount is larger than a predetermined value, the rotation speed of the compressor 31 is quickly changed.

When it is judged in the step S517 that the heating operation is executed, the routine proceeds to a step S518. In case that the heating operation is kept on following to the previous period, the rotation speed of the compressor 31 is slowly changed if the changing-speed is slow or the operation mode is changed from the quick heating operation to the stable heating operation, and the rotation speed of the compressor 31 is quickly changed if the changed amount of the setting temperature to be changed by the temperature setting lever is larger than the predetermined value.

When it is judged in the step S517 that the ventilating operation is executed, the routine proceeds to the step S530. In this case, the compressor 31 is stopped in the step S533, and the blower fan 37 and the actuators are controlled in the step S534.

Referring to FIGS. 6 to 9, there is shown a second embodiment of the air conditioner according to the present invention. In this embodiment, like parts and elements similar to those of the first embodiment are designated by the same numerals in the first embodiment, and explanations thereof are omitted herein.

Figure 6:
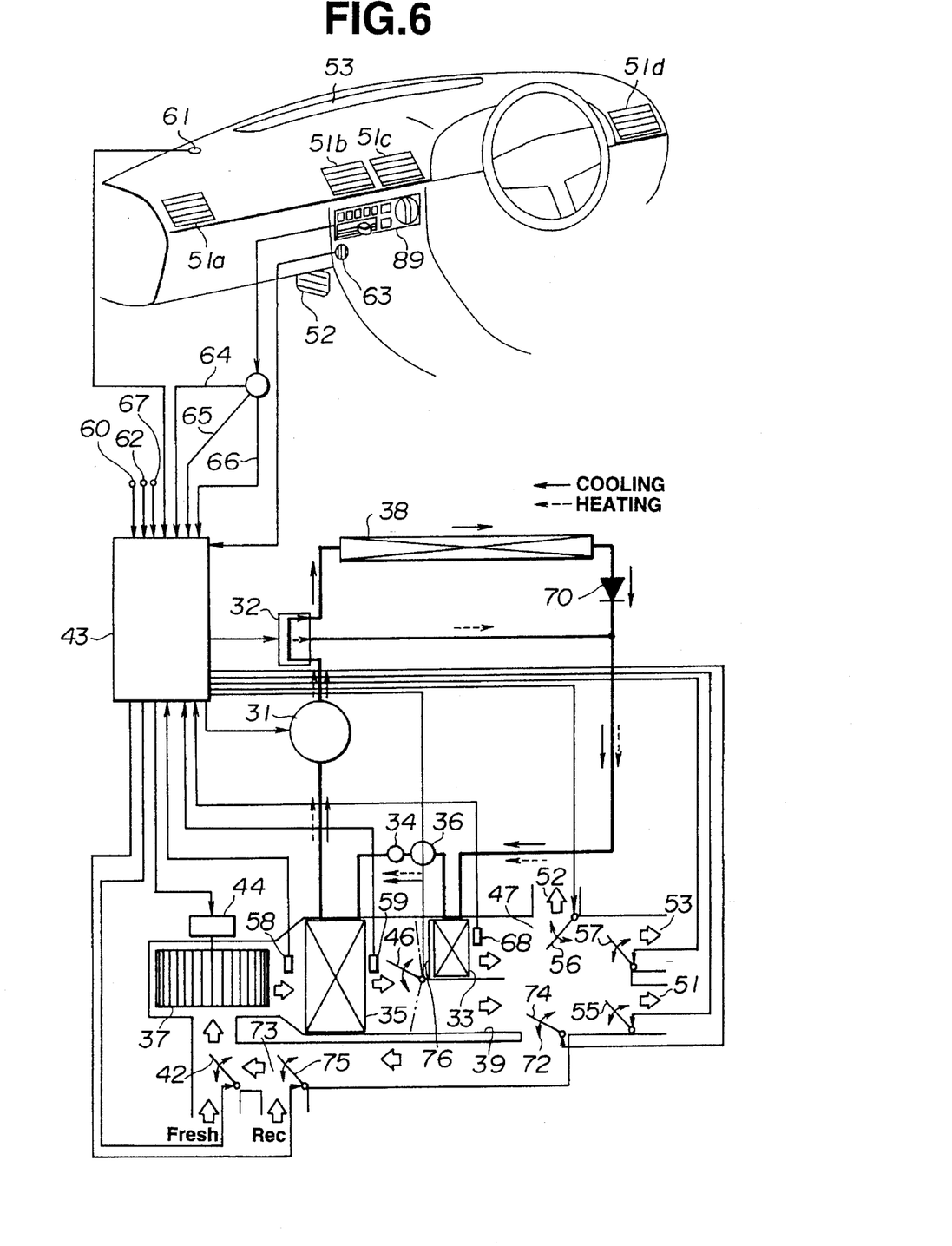
FIG. 6 is a schematic view of a second embodiment of the air conditioner for a vehicle according to the present invention.
Figure 7:
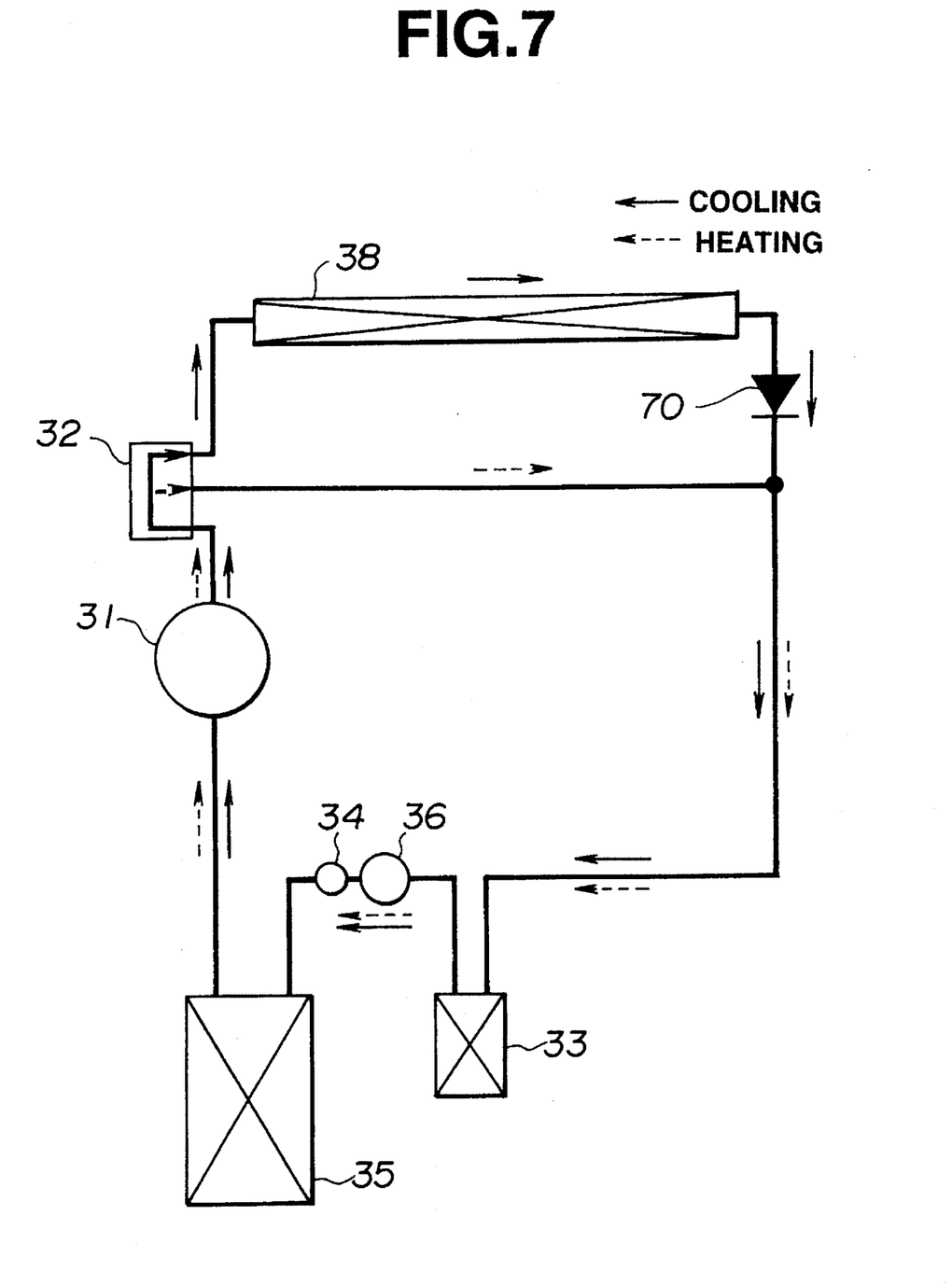
FIG. 7 is a schematic view of a refrigeration cycle of the second embodiment where a refrigerant flow during each operation mode is indicated by arrows.

As shown in FIGS. 6 and 7, the refrigeration cycle of the second embodiment comprises a three-way valve 32 instead of the four-way valve 90 and a receiver 36 instead of the accumulator 91. The receiver 36 is disposed upstream of the expansion valve 34. A heat-radiating inner heat exchanger 33 is disposed upstream of the receiver 36. The inner heat exchanger (heat-absorbing inner heat exchanger) 35 functions as a heat absorber in both of the cooling operation and the heating operation.

During the cooling operation, the three-way valve 32 is set as indicated by a solid line shown in FIG. 7. Accordingly, the refrigerant is circulated in the refrigeration cycle system as follows: the compressor 31→the outer heat exchanger 38→the heat-radiating inner heat exchanger 33→the receiver 36→the expansion valve 34→the inner heat exchanger 35→ the compressor 31. During this cooling operation, the outer heat exchanger 38 functions to radiate a heat of the refrigerant to the atmosphere, and the inner heat exchanger 35 functions to generate cooled air by transferring the heat of conditioned air to the refrigerant.

During the heating operation, the three way valve 32 is set as indicated by a broken line shown in FIG. 7. Accordingly, the refrigerant is circulated in the system as follows: the compressor 31→the heat-radiating inner heat exchanger 33→the receiver 36→the expansion valve 34→the inner heat exchanger 35→the compressor 31. During this heating operation, the inner heat exchanger 35 functions to generate cooled air by transferring the heat of conditioned air to the refrigerant as similar to the cooling operation, and the inner heat exchanger 33 functions to generate warmed air by radiating the heat of the refrigerant to the cooler air.

An air mixing door 46 is disposed between the inner heat exchanger 33 and the heat-absorbing inner heat exchanger 35 in the duct 39. The air mixing door 46 is driven by an air mixing door actuator (not shown) controlled by the control unit 43 so as to change the ratio of the air flow rates of cool air and warm air, wherein the cool air is air which bypasses the heat-radiating inner heat exchanger 33 and the warm air is the air which passes through the heat-radiating inner heat exchanger 33. An opening degree $X_{dsc}$ of the air mixing door 46 is defined as follows: When the air mixing door 46 is located at a position indicated by a long and short dash line in FIG. 6, that is, when the ratio of the cool air is 100%, the opening degree $X_{dsc}$ is defined as 0% (full close condition). When the air mixing door 46 is located at a position indicated by a long and two short dashes line in FIG. 6, that is, when the ratio of the warm air is 100%, the opening degree $X_{dsc}$ is defined as 100% (full open condition).

In order to further improve the mixing between cool air and warm air, an air mixing chamber 47 is disposed downstream of the heat-radiating inner heat exchanger 33 in the duct 39. Furthermore, in addition to the sensors equipped in the first embodiment, a refrigerant temperature sensor 67 is connected with the control unit 43 and detects a refrigerant outlet temperature $T_d$ of the heat-radiating inner heat exchanger 33. An air outlet temperature sensor 68 is connected with the control unit 43 and detects an outlet air temperature $T_v$ of the heat-radiating inner heat exchanger 33.

The manner of control method of the second embodiment will be discussed hereinafter.

Figure 8:
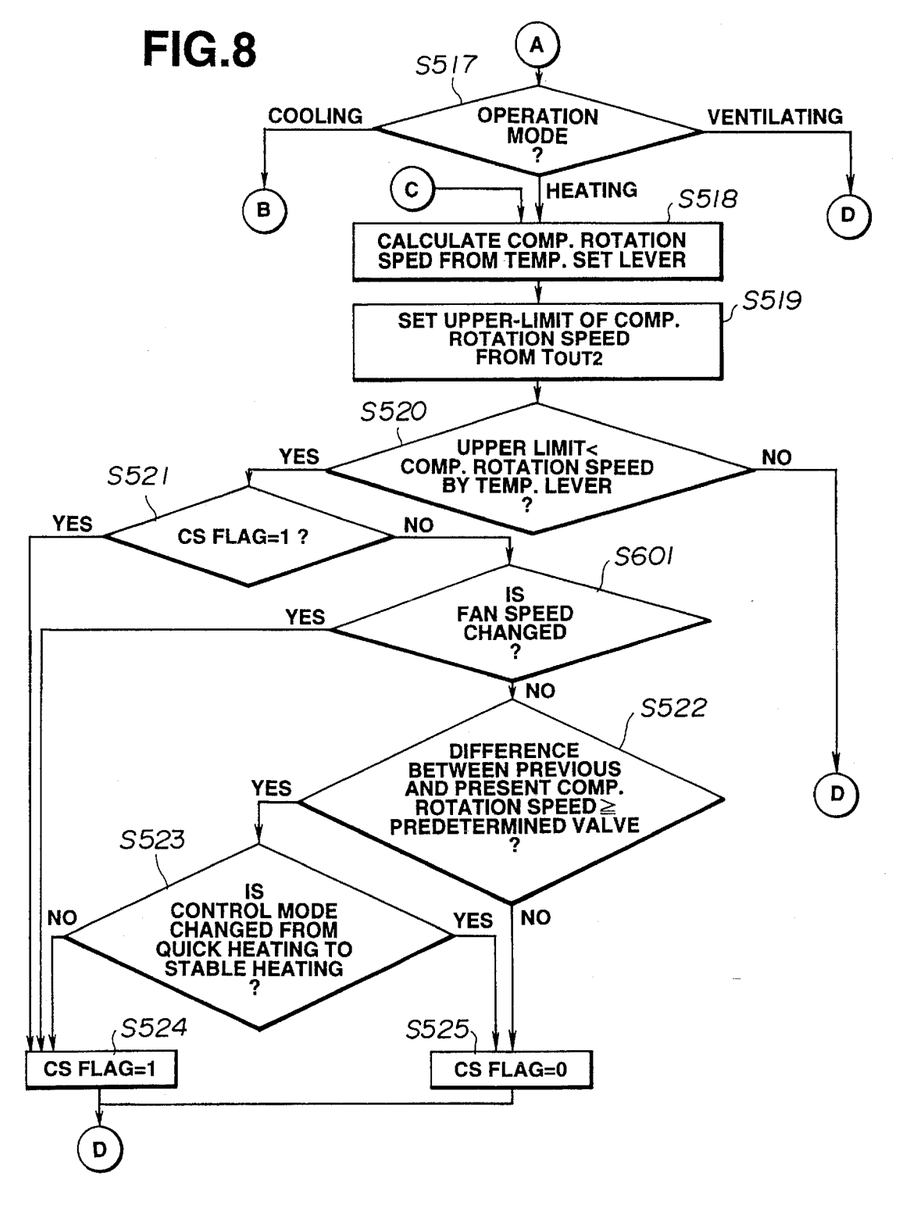
FIG. 8 is a part of a flowchart which is applied to the control of the second embodiment of FIG. 6.

In this second embodiment, the processing in the steps S501 to S516 shown in FIG. 3 of the first embodiment is similarly carried out. FIG. 8 shows a flowchart corresponding to a part of the flowcharts in FIG. 4. In FIG. 8, steps similar to those in FIG. 4 are designated by the same reference numerals. The steps S517 to S521 are similarly executed as in the first embodiment.

When the answer of the step S521 in FIG. 8 is "NO", that is, when the changing-speed flag is 0 (CS Flag=0), the routine proceeds to a step S601 wherein it is judged whether the blower fan speed is changed by means of the blower fan switch 66 or not. When the answer of the step S601 is "YES", the routine proceeds to a step S624 wherein the changing-speed flag is set at 1 in order to quickly change the rotation speed of the compressor 31. Then, the steps S530 to S534 of FIG. 5 are processed. In this case, the blower fan speed is controlled according to the rotation speed of the compressor 31. That is, if the speed of the blower fan 37 is changed, the air flow amount passing through the heat-radiating inner heat exchanger 33 is quickly changed. This may cause the pressure and temperature of the refrigeration cycle to be increased if the rotation speed of the compressor 31 is not adequately changed. Therefore, in order to keep on the pressure and temperature in the refrigeration cycle at an adequate state, the rotation speed of the compressor 31 is changed in a step S533. Since the changing-speed flag has been set at 1, the rotation speed of the compressor 31 is quickly changed. Accordingly, the passenger can certainly recognize the change of the rotation speed of the compressor 31 which is executed according to the change of the blower fan speed.

When the answer of the step S601 is "NO", the routine proceeds to the step S522 wherein it is judged whether the difference (deviation) between the previous and present rotation speed is larger than the predetermined value or not. That is, it is judged whether the change rate of the rotation speed is larger than the predetermined value or not. When the answer of the step S522 is "NO", the routine proceeds to the step S525 wherein the changing-speed flag is set at 0. Following this, the routine proceeds to the step S530. When the answer of the step S522 is "YES", that is, when the deviation of the rotation speed is larger than the predetermined value, the routine proceeds to the step S523 wherein it is judged whether the operation mode is changed from the quick heating operation (first control mode) to the stable heating operation (second control mode) or not. The quick heating operation is for quickly heating the passenger compartment by increasing the heating ability. The stable heating operation is executed when the temperature in the passenger compartment generally reaches the set temperature. In case that the quick heating operation is executed, the rotation speed of the compressor 31 is set maximum while the freezing of the outer heat exchanger 38 is prevented. Accordingly, when the operation mode is transferred from the quick heating operation to the stable heating operation, the rotation speed of the compressor 31 is decreased.

When the answer of the step S523 is "YES", it is judged that it is not necessary to inform the change of the rotation speed to the passenger since the change of the rotation speed of the compressor 31 is not executed by the passenger. Accordingly, the routine proceeds to a step S525 wherein the changing-speed of the rotation speed is set at 1. By slowly changing the rotation speed of the compressor, it becomes possible to suppress the unstable operation of the refrigeration cycle.

When the answer of the step S523 is "NO", it is judged that the change of the rotation speed has been commanded by the passenger, and the routine proceeds to a step S524 wherein the changing-speed of the rotation speed is set at 1.

Figure 4:
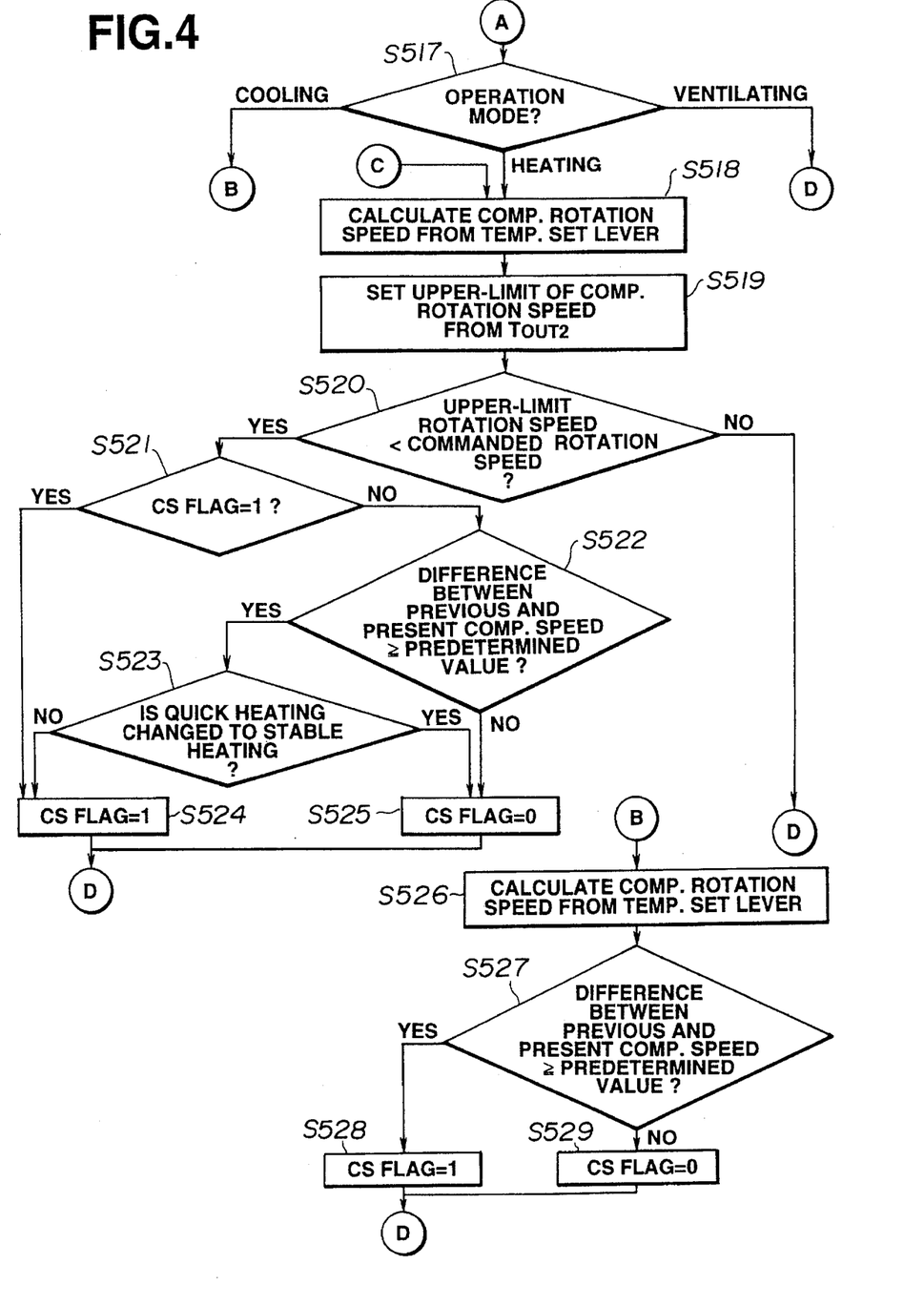
FIG. 4 is another part of the flowchart which is applied to the control of the first embodiment of FIG. 1.
Figure 9:
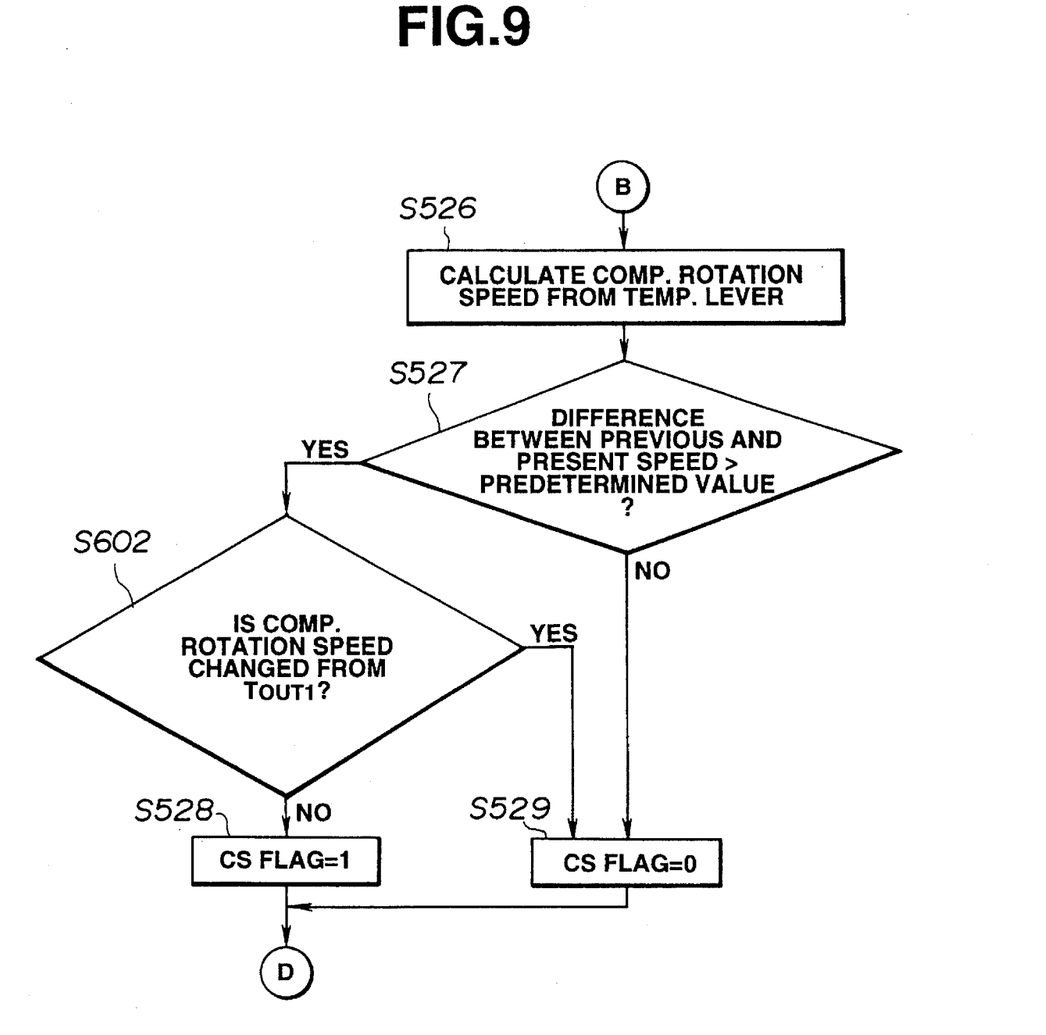
FIG. 9 is a part of a flowchart which is applied to the control of the second embodiment of FIG. 6.

FIG. 9 shows a flowchart corresponding a part of the flowchart in FIG. 4 of the first embodiment. In this flowchart, the same reference numerals designates like steps in the flowchart shown in FIG. 4.

When the answer of the step S527 in FIG. 9 is "YES", that is, when it is judged that the difference (deviation) of the rotation speed of the compressor 31 is larger than or equal to a predetermined value, the routine proceeds to a step S602 wherein it is judged whether the rotation speed of the compressor 31 is changed according to the outlet air temperature $T_{out1}$ of the inner heat exchanger 35 or not, in order to adequately control the temperature and pressure in the refrigeration cycle. When the answer of the step S602 is "NO", the routine proceeds to the step S528 wherein the changing-speed flag is set at 1 in order to quickly change the rotation speed of the compressor 31. When the answer of the step S602 is "YES", the routine proceeds to the step S529 wherein the changing-speed flag is set at 0 in order to slowly change the rotation speed of the compressor 31. On the other hand, when the answer of the step S527 is "NO", the routine proceeds to the step S529.

That is to say, the change of the rotation speed of the compressor 31 is executed in order to adequately control the temperature and the pressure in the refrigeration cycle, but not executed by the passenger. Accordingly, it is not necessary to inform the change of the rotation speed of the compressor 31. Therefore, the rotation speed is slowly changed in order to prevent the change of the rotation speed from degrading the stability of the refrigeration cycle. The other control of the second embodiment is similar to that of the first embodiment. Therefore, the explanation thereof is omitted herein.

Figure 10:
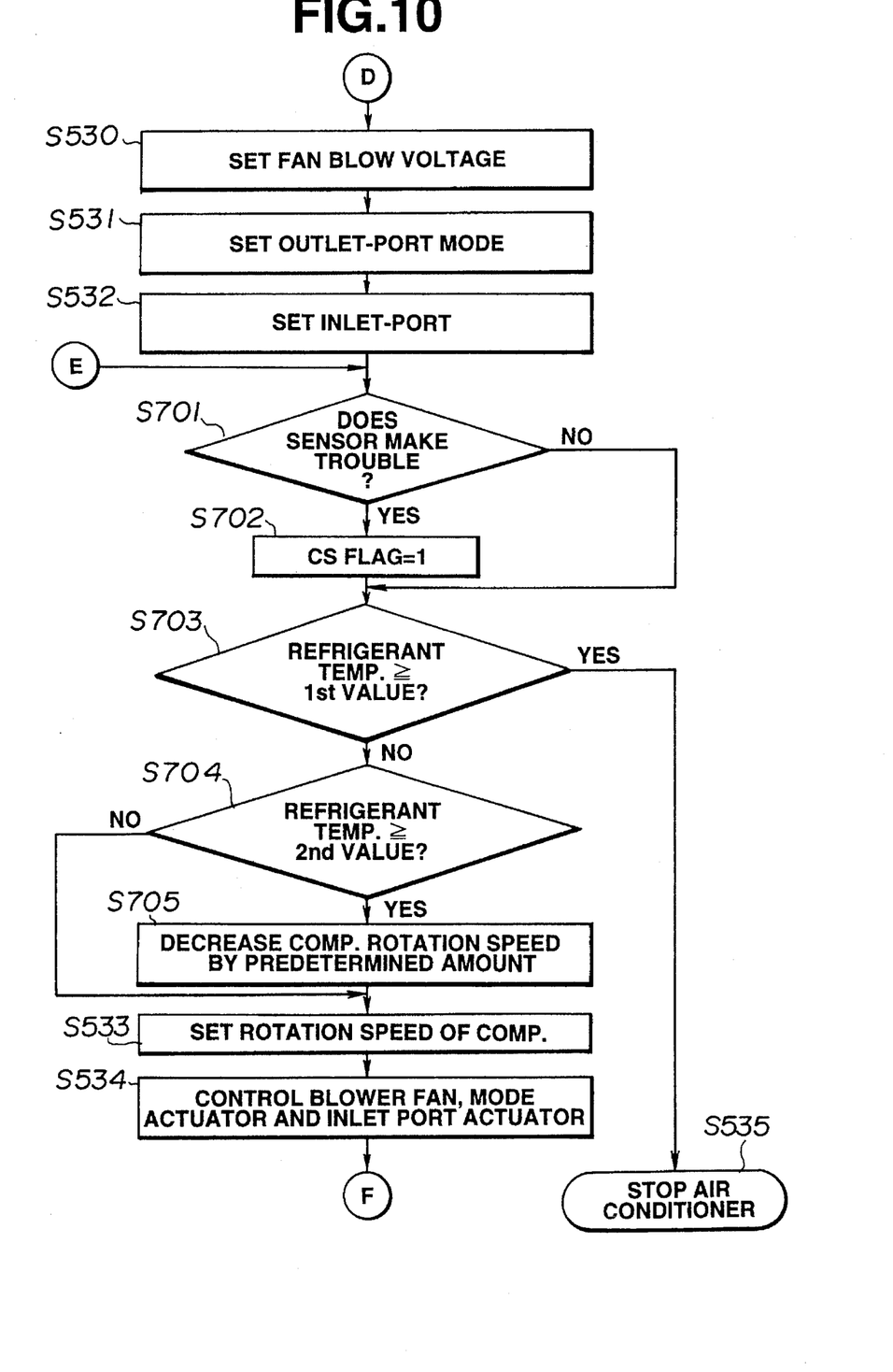
FIG. 10 is a part of a flowchart which is applied to the control of a third embodiment of the air conditioner according to the present invention.

Referring to FIG. 10, there is shown a third embodiment of the air conditioner according to the present invention. The construction of the third embodiment is the same as that of the second embodiment shown in FIG. 6.

The control of the third embodiment includes the processing shown in FIGS. 3, 8 and 9 of the first and second embodiments. FIG. 10 shows a flowchart corresponding to the flowchart of FIG. 5. The same reference numerals designate the same steps as those in the flowchart shown in FIG. 5.

In this third embodiment, following to the step S532, the routine proceeds to a step S701 wherein it is judged whether the sensors make trouble or not. The judgement is executed by previously setting an allowable range of the detection value of each sensor and by judging whether the actual detection value is within the allowable range or not. When the answer of the step S701 is "NO", that is, when every sensors correctly operate, the routine jumps to a step S703. When the answer of the step S701 is "YES", that is, when either sensor is abnormal, the routine proceeds to a step S702 wherein the changing-speed flag is set at 1. Following this, the routine proceeds to the step S703 wherein it is judged whether the refrigerant temperature from the compressor 31 is higher than or equal to a first predetermined value such as 100° to 120° C. When the answer of the step S703 is "YES", that is, when the temperature and/or pressure of the high pressure side of the refrigeration cycle is too high, the routine proceeds to a step S535 wherein the air conditioner is stopped in order to prevent the air conditioner from going wrong. In this operation, the rotation speed of the compressor 31 is quickly lowered. When the answer of the step S703 is "NO", the routine proceeds to a step S704 wherein it is judged whether the refrigerant temperature from the compressor 31 is higher than or equal to a second predetermined value such as 90° to 95° C. When the answer of the step S704 is "NO", the routine jumps to a step S533. When the answer of the step S704 is "YES", the routine proceeds to a step S705 wherein the rotation speed of the compressor 31 is quickly decreased by a predetermined amount such as about 30% of the maximum rotation speed. Then, the routine proceeds to the step S533. It will be understood that the control of the third embodiment may be executed by substituting the refrigerant temperature by a refrigerant pressure.

In the step S533 the rotation speed of the compressor 31 is set. When the change command of the rotation speed has not been outputted, the rotation speed is kept at a present speed. When the change command has been outputted, the rotation speed is changed to correspond with a commanded rotation speed. When the stoppage of the compressor 31 has been commanded, the compressor 31 is stopped. In case that the rotation speed of the compressor 31 is changed, the rotation speed is quickly changed if CS Flag=1, and the rotation speed is slowly changed if CS Flag=0.

In this embodiment, when the answer of the step S701 is "YES", the compressor 31 is stopped since it becomes difficult to accurately execute the air conditioning control. At this flow, since the changing-speed flag is set at 1, the rotation speed of the compressor 31 is quickly lowered.

Although the preferred embodiments have been shown and described so as to output the switching command as to the cooling, the heating and the ventilating operations and the change command of the compressor rotation speed through the temperature setting lever constituting the temperature setting device 64 so as to function as both of the compressor commanding means and the thermal commanding means, it will be understood that such two means may be separately formed by the respective control means. Further, although the preferred embodiments have been shown and descried such that the refrigerant discharge amount is controlled by changing the rotation speed of the compressor 31, the change of the refrigerant discharge amount is changed by changing the discharging capacity in case of a variable capacity type compressor.

What is claimed is:

1. A heat pump type air conditioner for a vehicle, comprising:

refrigerant;

a compressor applying a workload to said refrigerant;

a compressor commanding means for commanding said compressor to set a correlation amount of a refrigerant discharge amount according to a vehicle passenger's operation;

an air-flow making means for making a flow of conditioned air to be supplied to a passenger compartment;

a flow-rate commanding means for commanding said air-flow making means to set a flow rate of the flow of the conditioned air according to the vehicle passenger's operation;

a thermal control means for thermally controlling the conditioned-air, said thermal controlling means including a refrigeration cycle where said refrigerant is circulated by the operation of said compressor;

a thermal-control commanding means for commanding said thermal control means to be set at a thermal operating condition according to the vehicle passenger's operation;

a changing-speed setting means for setting a changing-speed of a correlation amount of a refrigerant discharge amount from said compressor according to a presence of a command from at least one of said compressor commanding means, said flow-rate commanding means and said thermal-control commanding means; and a control means for controlling said compressor, said air-flow making means and said thermal control means according to the command from said compressor commanding means, said flow rate commanding means and said thermal-control means, said control means controlling said compressor so that the correlation amount of the refrigerant discharge amount is changed at the changing-speed set by said changing-speed setting means.

2. A heat pump type air conditioner as claimed in claim 1, wherein a changing-speed set by said changing-speed setting means in a first state is higher than a changing-speed set by said changing-speed setting means in a second state, the first state corresponding to a case that the correlation amount of the refrigerant discharge amount is changed according to the command of one of said compressor commanding means, said flow-rate commanding means and said thermal-control commanding means, the second state corresponding to a case that the correlation amount of the refrigerant discharge amount is changed without regard to the command of said compressor commanding means, said flow-rate commanding means and said thermal-control commanding means.

3. A heat pump type air conditioner as claimed in claim 1, wherein said refrigeration cycle comprises a heat-radiating heat exchanger which is connected to a refrigerant discharge side of said compressor and which radiates a heat of said refrigerant to one of the ambient air, an expansion means which is connected to a refrigerant outlet side of the heat-radiating heat exchanger, and a heat-absorbing inner heat exchanger which is connected to a refrigerant output of the heat-radiating inner heat exchanger and a refrigerant inlet of said compressor and which transfers a heat of the conditioned-air to said refrigerant.

4. A heat-pump type air conditioner as claimed in claim 3, wherein when a command for stopping said compressor is outputted, said changing-speed setting means sets the changing-speed of the refrigerant discharge correlation amount for stopping said compressor so as to be larger than that in a case the refrigerant discharge correlation amount is changed without regard to the command of one of said compressor commanding means, said flow-rate commanding means and said thermal-control commanding means.

5. A heat-pump type air conditioner as claimed in claim 4, further comprising an operating condition switching means which selects a control mode from a ventilating operation where said compressor is not operated and said air-flow making means is operated, and a thermal-control operation where said compressor and said air-flow making means are operated;

wherein when said compressor commanding means commands said compressor to stop and when said operating-condition switching means switches an operating condition of the air conditioner from the thermal operation to the ventilating operation, said changing-speed setting means sets the changing-speed of the correlation amount for stopping said compressor so as to be larger than that in a case that the correlation amount of the refrigerant discharge amount is changed without regard to the command from at least one of said compressor commanding means, said flow-rate commanding means and said thermal-control commanding means.

6. A heat-pump type air conditioner as claimed in claim 3, wherein said changing-speed setting means sets the changing-speed of the correlation amount of the refrigerant discharge amount for operating said compressor from a stopped state to an operating state so as to be larger than that in a case that the correlation amount of the refrigerant discharge amount is changed without regard to the command of one of said compressor commanding means, said air flow rate commanding means and said thermal-control commanding means.

7. A heat pump type air conditioner as claimed in claim 6, further comprising an operating condition switching means which selects a control mode from a ventilating operation where said compressor is not operated and said air-flow making means is operated, and a thermal-control operation where said compressor and said air-flow making means are operated;

wherein when said compressor commanding means commands said compressor to start up and when said operating-condition switching means switches an operating condition of the air conditioner from the ventilating operation to the thermal operation, said changing-speed setting means sets the changing-speed of the correlation amount for stopping said compressor so as to be larger than that in a case that the correlation amount of the refrigerant discharge amount is changed without regard to the command from at least one of said compressor commanding means, said flow-rate commanding means and said thermal-control commanding means.

8. A heat-pump type air conditioner as claimed in claim 3, wherein a changing-speed set by said changing-speed setting means in a first state is higher than a changing-speed set by said changing-speed setting means in a second state, the first state corresponding to a case that the correlation amount of the refrigerant discharge amount is changed according to the command of one of said compressor commanding means and said thermal-control commanding means, the second state corresponding to a case that the correlation amount of the refrigerant discharge amount is changed without regard to the command of said compressor commanding means and said thermal-control commanding means.

9. A heat-pump type air conditioner as claimed in claim 3, wherein a changing-speed set by said changing-speed setting means in a first state is higher than a changing-speed set by said changing-speed setting means in a second state, the first state corresponding to a case that said thermal control commanding means commands a switching of the operating condition between the heating operation and the cooling operation, the second state corresponding to a case that the correlation amount of the refrigerant discharge amount is changed without regard to the command of said compressor commanding means and said thermal-control commanding means.

10. A heat-pump type air conditioner as claimed in claim 3, wherein said controlling means comprises an automatic discharge amount changing section which changes the refrigerant discharge correlation amount of said compressor according to the temperature of the conditioned air flowed into the heat-absorbing inner heat exchanger, said changing-speed setting means setting the changing-amount so as to be smaller than that in a case the changing-speed is changed according to the command of one of said compressor commanding means, said air flow rate commanding means and said thermal-control commanding means when the refrigerant discharge correlation amount of said compressor is changed by the automatic discharge amount changing section.

11. A heat-pump type air conditioner as claimed in claim 3, wherein said controlling means sets a physical amount corresponding to an upper limit of the correlation amount of the refrigerant discharge amount according to a temperature of the conditioned air flowed to the heat-absorbing inner heat exchanger during a heating operation, said control means executing a control for maintaining the correlation amount of the refrigerant discharge amount so as to be smaller than the physical amount, said changing-speed setting means setting the changing-speed so as to be smaller than that in a case the changing-speed is changed according to the command of one of said compressor commanding means, said flow-rate commanding means and said thermal-control commanding means, when the refrigerant discharge correlation amount is changed so as to maintain the refrigerant discharge correlation amount to be smaller than the upper limit.

12. A heat-pump type air conditioner as claimed in claim 3, wherein a heating operation of the air conditioner includes a first control mode and a second control mode which are different in control method;

wherein said control means changes the correlation amount of the refrigerant discharge amount when the heating operation is changed from the first control mode to the second control mode, said changing-speed setting means setting the changing-speed so as to be smaller than that in a case the changing-speed is changed according to the command of one of said compressor commanding means, said flow-rate commanding means and said thermal-control commanding means, when the correlation amount of the refrigerant discharge amount is changed according to a switching from the first control mode to the second control mode.

13. A heat-pump type air conditioner as claimed in claim 1, wherein said controlling means changes the refrigerant discharge correlation amount by changing one of a rotation speed and a discharge capacity of said compressor.

14. A heat-pump type air conditioner as claimed in claim 1, wherein said thermal-control means is set at one of a quick heating operation, a stable heating operation, a cooling operation and a ventilating operation operations.

15. A heat pump type air conditioner for a vehicle, comprising:

an air-flow making means for making a flow of conditioned air to be supplied to a passenger compartment;

a flow-rate commanding means for commanding said air-flow making means to set a flow rate of the flow of the conditioned air according to a vehicle passenger's operation;

a compressor applying a workload to refrigerant;

a compressor commanding means for commanding said compressor to set a correlation amount of a refrigerant discharge amount according to the vehicle passenger's operation;

an outer heat exchanger connected to a refrigerant outlet side of said compressor and radiating a heat of said refrigerant from said compressor into atmosphere;

a heat-radiating inner heat exchanger connected to a refrigerant discharge side of said compressor and generating warm air by radiating a heat of the refrigerant to a flow of the conditioned air;

an expansion device connected to a refrigerant outlet side of said heat-radiating inner heat exchanger and adiabatically expanding the refrigerant;

a heat-absorbing inner heat exchanger connected to a refrigerant outlet side of said expansion device and a refrigerant inlet side of said compressor, said heat-absorbing inner heat exchanger generating cool air by transmitting a heat of the conditioned air to the refrigerant which is adiabatically expanded after being cooled in at least one of said outer heat exchanger and said heat-radiating inner heat exchanger;

a refrigerant flow switching device disposed among the refrigerant discharge side of said compressor, a refrigerant inlet side of said outer heat exchanger, and a refrigerant inlet side of said heat-radiating inner heat exchanger, said refrigerant flow switching device leading the refrigerant from said compressor to at least the outer heat exchanger during cooling operation and leading the refrigerant from said compressor to said heat-radiating inner heat exchanger while bypassing said outer heat exchanger during heating operation;

a thermal-control commanding means for commanding a refrigeration cycle system constituted by said outer heat exchanger, said heat-radiating inner heat exchanger, said heat-absorbing inner heat exchanger, said expansion device and said refrigerant flow switching device, said thermal-control commanding means commanding the refrigeration cycle system so as to take an operation mode according to the vehicle passenger's operation;

a speed-change setting means for setting a speed-change of a correlation amount of a refrigerant discharge amount from said compressor according to a presence of a command from at least one of said compressor commanding means, said flow-rate commanding means and said thermal-control commanding means;

a control means for controlling said compressor, said air-flow making means and said thermal control means according to the command from said compressor commanding means, said flow-rate commanding means and said thermal-control commanding means, said control means controlling said compressor so that the correlation amount of the refrigerant discharge amount is changed at the changing-speed set by said changing-speed setting means.

16. A heat pump type air conditioner as claimed in claim 15, wherein said controlling means comprises an air flow rate changing section which changes a flow rate of the conditioned air according to said flow-rate commanding means during the heating operation and a discharge amount changing section which changes the changing-speed of the correlation amount according to the change of the flow rate, said changing-speed setting means setting the changing-speed so as to be larger than that in a case the changing-speed is changed according to the command of one of said compressor commanding means, said flow-rate commanding means and said thermal-control commanding means when the correlation amount of the refrigerant discharge amount is changed according to the change of the air flow rate.

17. A heat pump type air conditioner as claimed in claim 15, wherein said controlling means changes the correlation amount of the refrigerant discharge amount according to a physical amount relating to the outlet air temperature from said heat-absorbing inner heat exchanger, said changing-speed setting means setting the changing-speed so as to be smaller than that in a case the speed-change is changed according to the command of one of said compressor commanding means, said flow-rate commanding means and said thermal-control commanding means, when the correlation amount of the refrigerant discharge amount is changed according to the physical amount.

18. A heat pump type air conditioner for a vehicle, comprising:

a compressor applying a workload to said refrigerant;

a compressor commanding means for commanding said compressor to set a correlation amount of a refrigerant discharge amount according to a vehicle passenger's operation;

an air-flow making means for making a flow of conditioned air to be supplied to a passenger compartment;

a flow-rate commanding means for commanding said air-flow making means to set a flow rate of the flow of the conditioned air;

a thermal control means for thermally controlling the conditioned-air, said thermal controlling means including a refrigeration cycle where said refrigerant is circulated by the operation of said compressor;

a thermal-control commanding means for commanding said thermal control means to be set at a thermal operating condition; and a control means for controlling said compressor, said air-flow making means and said thermal control means according to the command from said compressor commanding means, said flow-rate commanding means and said thermal-control means, said control means controlling said compressor so that a refrigerant discharging capacity of said compressor under a first state is rapidly changed as compared with said compressor under a second state wherein the first state corresponds to a case that it is necessary to inform the change of the correlation amount of the refrigerant discharge amount to a vehicle passenger, and the second state corresponds to a case that it is not necessary to inform the change of the correlation amount of the refrigerant discharge amount to the vehicle passenger.

19. A heat-pump type air conditioner as claimed in claim 18, wherein said controlling means stops said compressor by lowering the correlation amount of the refrigerant discharge amount at a first speed when one of the pressure and the temperature of the refrigerant in a high pressure side of the refrigeration cycle system is higher than a first predetermined value, and by lowering the correlation amount by a predetermined amount at a second speed lower than the first speed, when one of the pressure and the temperature in a high pressure side of the refrigeration cycle is lower than the first predetermined value and higher than a second predetermined value.

20. A heat pump type air conditioner as claimed in claim 18, wherein when a difference between a target value of the correlation amount and an actual correlation amount is larger than a predetermined value, the correlation amount is approached to the target correlation amount by changing the correlation amount at a first speed, and when a difference between the target correlation amount and the actual correlation amount is smaller than the predetermined value, the correlation amount is approached to the target correlation amount by changing the correlation amount by a predetermined amount at a second speed which is smaller than the first speed.

21. A heat pump type air conditioner as claimed in claim 18, further comprising a detecting means for detecting a physical amount for use in the control of the air conditioner and a judging means for judging whether an output of the detecting means is abnormal or not, wherein said control means stops said compressor by decreasing the refrigerant discharge amount at a speed which is higher than a speed in a case that the judging means judges that the output of the detecting means is not abnormal, when it is judged that the output of the detecting means is abnormal.

22. A heat-pump type air conditioner as claimed in claim 18, wherein said controlling means changes the refrigerant discharge correlation amount by changing one of a rotation speed and a discharge capacity of said compressor.

* * * * *